United States Patent [19]
Schwanda

[11] Patent Number: 5,796,191
[45] Date of Patent: *Aug. 18, 1998

[54] BULB-TYPE GENERATOR

[75] Inventor: Josef Schwanda, Lupfig, Switzerland

[73] Assignee: Asea Brown Boveri AG, Baden, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 685,098

[22] Filed: Jul. 22, 1996

[30] Foreign Application Priority Data

Jul. 21, 1995 [DE] Germany .................. 195 26 689.7

[51] Int. Cl.$^6$ .................................................. H02K 1/12
[52] U.S. Cl. .............................. 310/58; 310/59; 310/52; 310/54; 310/65; 310/216; 310/217; 310/258
[58] Field of Search .................................. 310/216, 217, 310/52, 54, 58, 65, 59, 258

[56] References Cited

U.S. PATENT DOCUMENTS

| | | | |
|---|---|---|---|
| 1,764,890 | 6/1930 | Reichel | 310/217 |
| 4,593,223 | 6/1986 | Lehoczky | 310/258 |

FOREIGN PATENT DOCUMENTS

| | | | |
|---|---|---|---|
| 181892 | 5/1955 | Austria . | |
| 46315 | 7/1981 | European Pat. Off. . | |
| 413708 | 9/1993 | European Pat. Off. . | |
| 388676 | 1/1924 | Germany . | |
| 605083 | 11/1934 | Germany . | |
| 907791 | 2/1954 | Germany | 310/58 |
| 3707422 | 3/1987 | Germany . | |
| 300239 | 9/1932 | Italy | 310/58 |
| 136540 | 5/1989 | Japan | 310/52 |
| 406267 | 2/1975 | U.S.S.R. | 310/217 |
| 530392 | 1/1977 | U.S.S.R. | 310/216 |
| 634424 | 11/1978 | U.S.S.R. | 310/58 |
| 1504736 | 8/1989 | U.S.S.R. | 310/65 |
| 182896 | 7/1922 | United Kingdom | 171/252 |
| 322829 | 9/1925 | United Kingdom . | |

OTHER PUBLICATIONS partial translation of Soviet Union Patent 406,267(cited in PTO-982 paper 3) Feb. 7, 1975.

*Primary Examiner*—Steven L. Stephan
*Assistant Examiner*—K. Imayoshi Eizo Tamai
*Attorney, Agent, or Firm*—Oblon, Spivak, McClelland, Maier & Neustadt, P.C.

[57] ABSTRACT

In the bulb-type generator, the stator laminated body (2) is suspended on the housing ring (1) by means of V-shaped elements (14). The housing ring is reinforced by the V-shaped elements. Air or cooling water can be directed for cooling purposes to the cavities (18) produced by the V-shaped elements (14) and the inner wall of the housing ring (1). In this way, a portion of the lost heat is already dissipated over flowing water when passing over the cold housing wall enlarged by the V-shaped elements (14).

9 Claims, 5 Drawing Sheets

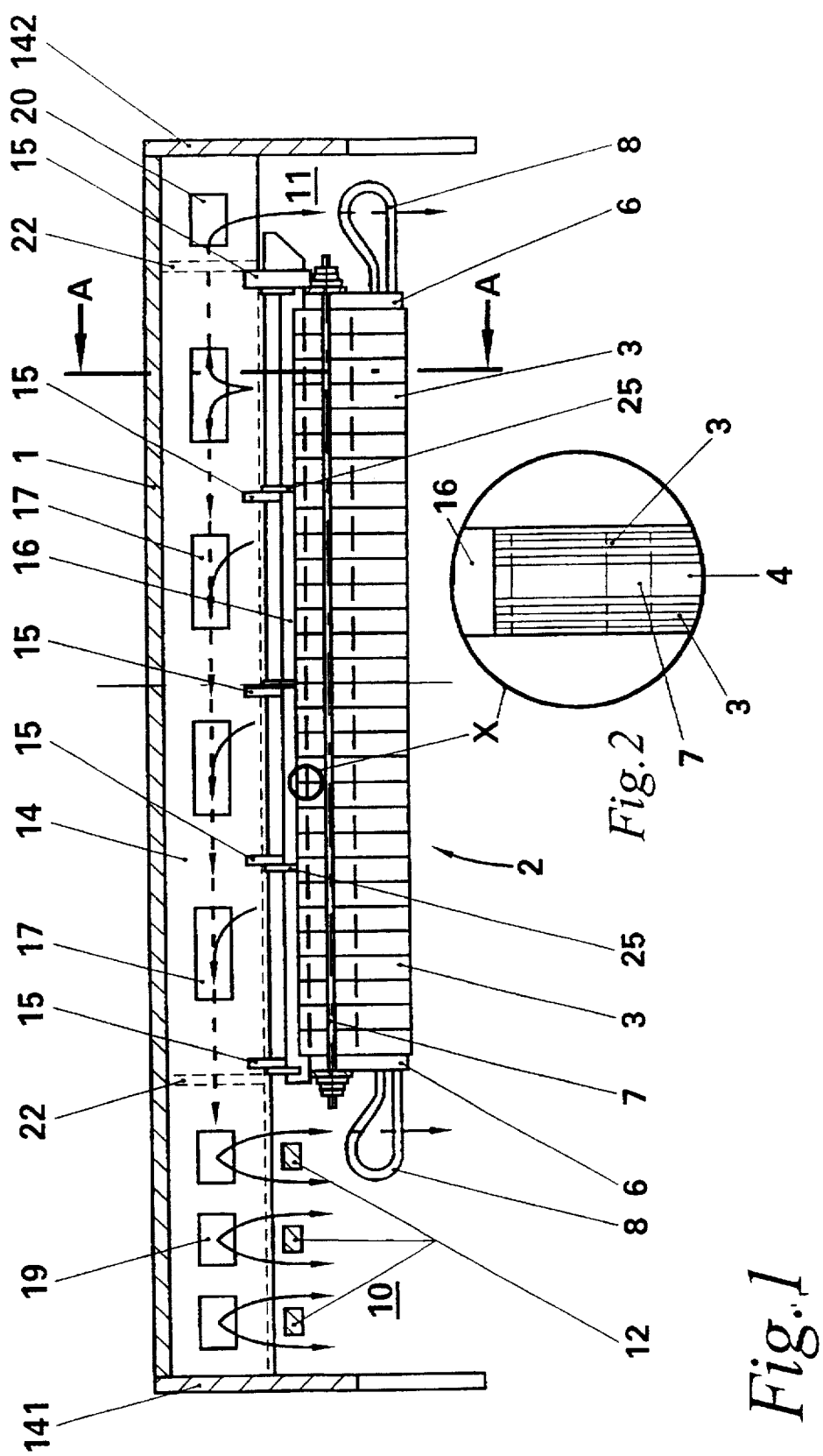

BULB-TYPE GENERATOR

BACKGROUND OF THE INSERTION

Field of the Invention

The invention relates to a bulb-type generator having a housing comprising a spherical cap and a housing ring adjoining the latter, and having a stator laminated body which is surrounded by the housing ring and held in the latter, the stator laminated body being constructed from overlappingly laminated segmental stampings and being mounted on the housing ring, around which the motive water flows, by means of axially extending strips with the interposition of spacer elements, the stator laminated body consisting of a plurality of mutually spaced component laminated bodies, and it being possible for cooling air to be led radially outward through the spaces between the individual component laminated bodies into the space between the stator laminated body and housing ring and out from there to coolers in the-spherical cap.

The invention proceeds in this case from a bulb-type generator such as is known, for example, from EP-0 413 708 B1.

DISCUSSION OF BACKGROUND

For design reasons, in bulb-type generators of low and medium power the stator laminated body, which is constructed from overlappingly laminated segmental stampings, is mounted directly on the housing ring around which the motive water flows. In order to increase the dissipation of heat from the stator laminated body via the housing ring to the motive water, EP 0 413 708B1 discloses that an elastically deformable material of good thermal conductivity is introduced into the gap, dictated by design and production, between the stator laminated body and housing ring.

In bulb-type generators of higher power and having housing ring diameters of 8 meters and more, owing to housing shrinkage due to the cold flowing water and to the enlargement of the laminated body owing to heating during operation of the machine mechanical stresses occur in the housing which cannot be mastered by elastically deformable material alone. In addition, there are magnetic forces which have a negative influence on preserving the roundness of the stator laminated body.

For this reason, in the case of large bulb-type generators there has been a move to space the stator laminated body from the inner wall of the housing ring and to conduct a coolant in the enclosed circuit through the gap thus produced. Such arrangements are denoted in the literature as annular surface coolers or gap coolers. The associated air-water coolers or waterwater coolers are located in this case in the spherical cap of the bulb-type generator. While no particular problems arise in cooling arrangements having air as coolant, in the case of water cooling the gap through which the cooling water flows must be sealed off from the stator laminated body.

SUMMARY OF THE INVENTION

Accordingly, one object of this invention is to provide a novel bulb-type generator which, even in the case of large housing ring diameters, renders possible a rigid stator suspension able to withstand all thermal and magnetic loads, and which can be optimally cooled.

According to the invention, this object is achieved when the spacer elements are designed as cavities extending axially and having a trapezoidal, in the limiting case substantially V-shaped cross section, or form such a cross section together with the inner wall of the housing ring, the wider base of said cavities being situated radially outside on the housing ring, -the housing ring itself forming this base, and there being provided on the narrower base of said cavities mounting plates, extending in the circumferential direction, for accommodating the strips, and it being possible to conduct a coolant through said cavities.

The advantage of the invention is to be seen, in particular, in that the cavities make a substantial contribution to reinforcing the housing ring. Preferably, the cavities have a substantially V-shaped cross section, the free limb ends of neighbouring cavities lying tightly against one another. This structure increases the surface of the housing ring, with the result that the cooling air flowing out from the radial cooling slits between the component laminated bodies into the back of the stator is already cooled upstream of the actual coolers arranged in the spherical cap, with the result that a portion of the lost heat of the machine is already dissipated over flowing water when passing over the housing wall enlarged by the cavities.

The invention is suitable both for pure air cooling and for combined water-air cooling:

In the case of pure air cooling, the cavities serve the purpose of the orderly removal of the air flowing radially outward from the stator laminated body, owing to the fact that over the entire core length said cavities are provided with first openings into which the (heated) air flows in an essentially radial fashion and then flows axially in the interior of the cavities on both end faces of the machine. Outside the core length, the cavities are provided with second openings, through which the air, now partially already cooled, leaves the cavities again and flows into the overhang space, flows there around the winding overhang and the winding connections, is finally collected and then fed to the coolers in the spherical cap.

The air flowing in on both sides is preferably split up in this way such that the majority flows- to the end of the machine on the spherical cap side. This quantitative splitting up can be performed in a simple way by means of the size of the area of passage of the second openings.

No openings are provided in the cavities in the case of combined water-air cooling. Viewed axially, the cavities are (hydraulically) interconnected outside the stator laminated body by means of channels in such a way that cooling water flows through all the cavities in a meandering fashion. This measure also increases the active cooling surface of the housing ring without special water-water or water-air coolers being required in the spherical cap. In this arrangement, the (heated) air coming from the stator laminated body flows, as before, into the back of the stator.

Under extreme conditions, for example high temperatures of the flowing water, the cooling water circuit can be extended by special coolers in the spherical cap.

Exemplary embodiments of the invention and further advantages achieved thereby are explained in more detail below with the aid of the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a simplified longitudinal section through the stator of a bulb-type generator;

FIG. 2 shows the detail X from FIG. 1;

DESCRIPTION OF THE PREFERRED EMBODIMENT

Figure 5:
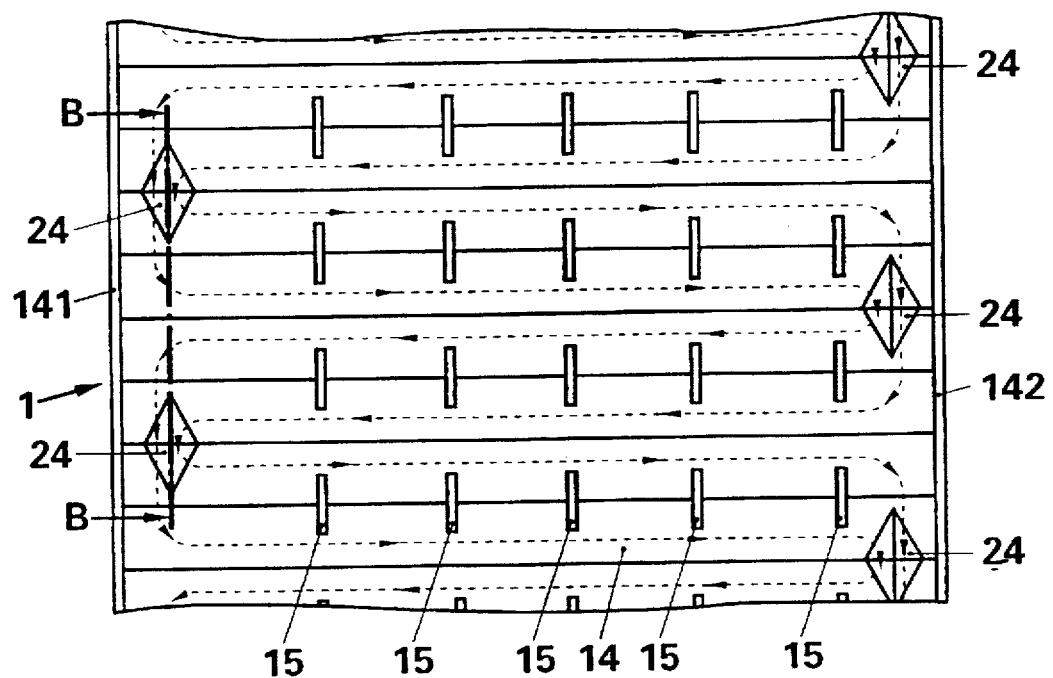
FIG. 5 as a modification of FIG. 3 a plan view of the inner wall of a housing ring provided with cavities according to FIG. 6, as configured for water cooling.

Referring now to the drawings, wherein like reference numerals designate identical or corresponding parts throughout the several views, with the exception of the support and spacing, the bulb-type generator represented diagrammatically in FIG. 1 corresponds largely to the prior art such as known, for example, from "Brown Boveri Mitteilungen" 4–70, pages 182 to 190, in particular FIG. 5 on page 186. The bulb-type generator comprises a housing, of which only the housing ring 1 is represented in FIG. 1. The spherical cap, which adjoins on the left and in which, inter alia, the cooler or coolers are also accommodated, and the turbine part adjoining on the right are not illustrated, nor is the bearing. They correspond to the design according to FIG. 5 of the said publication BROWN BOVERI Mitt.

The stator 2 comprises a stator laminated body, constructed from axially spaced component laminated bodies 3 and having radially extending cooling slits 4 (compare detail X in FIG. 2). The component laminated bodies 3 are constructed in a known way from segmental stampings 5, which are stacked on one another and offset in position, and pressed together by means of clamping plates 6 and axial tie bolts 7. The stator winding, of which only the winding overhangs 8 at the two end faces are visible in FIG. 1, is accommodated in slots 9. The winding connections 12 and leads are indicated in the overhang space 10 on the spherical cap side.

The stator laminated body 2 is spaced from the housing ring 1. V-shaped spacer elements 14 are arranged in the annular space 13 thus formed between these two parts. The spacer elements 14 extend over the entire inner circumference of the housing ring 1 and are covered at the end by rings 141, 142. These rings simultaneously serve as mounting flanges for the spherical cap and the turbine housing. Together with the housing ring 1, the spacer elements 14 form cavities in the form of axially extending channels. The free limb ends of the spacer elements 14 are welded to the inside of the housing ring 1, neighbouring limbs lying tightly against one another. Mounted on the apex of each spacer element 14 is a mounting plate 15 which radially inward has a swallowtailed recess (compare FIG. 3). As seen from FIG. 1 and the development, represented in FIG. 4, of the housing ring 1 provided with spacer elements 14, a plurality of mounting plates 15 distributed uniformly in the machine longitudinal direction are provided on each spacer element 14. The recesses assigned to a spacer element 14 are aligned with one another. They accommodate strips 16 which have a double swallowtailed cross section and extend over the entire length of the stator laminated body 2. The individual segmental stampings 5 likewise have swallowtailed recesses. During lamination of the stator laminated body, the segmental stampings 5 are pushed over the strips 16 from one end - from the spherical cap end in the case of the example. -The distancing of the individual component laminated bodies 3 is performed in a known way by interposing radially directed spacer strips (not represented in the drawing).

Figure 3:
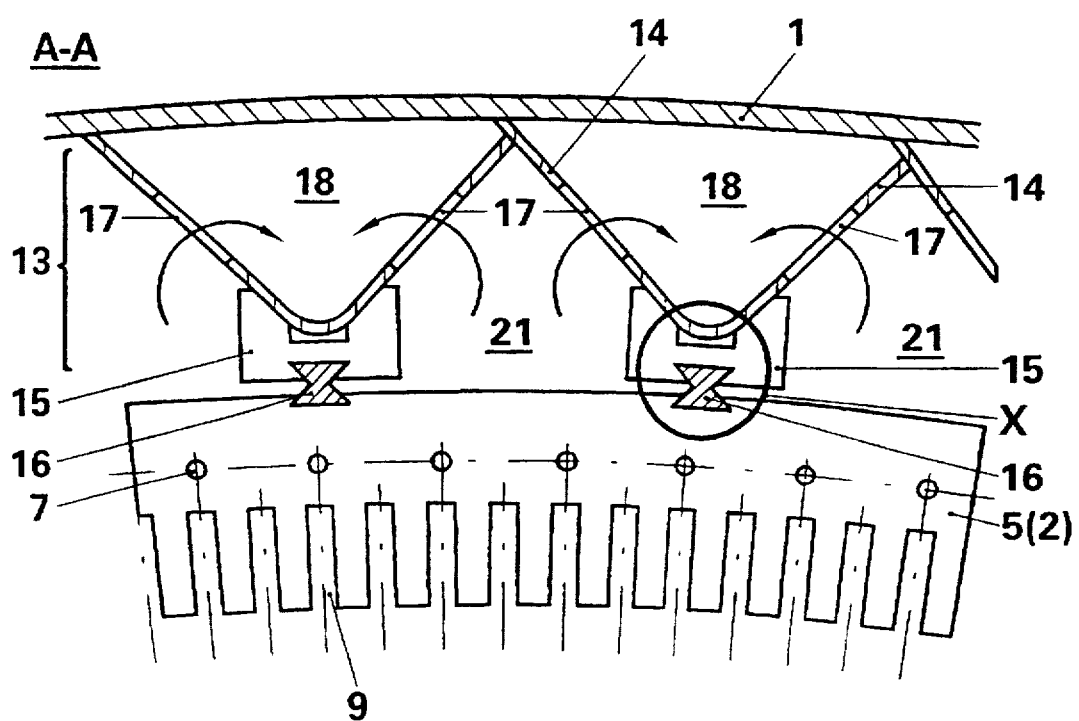
FIG. 3 shows a cross section through the stator in accordance with FIG. 1 along the line AA therein with V-shaped cavities as spacer element for pure air cooling.
Figure 3A:
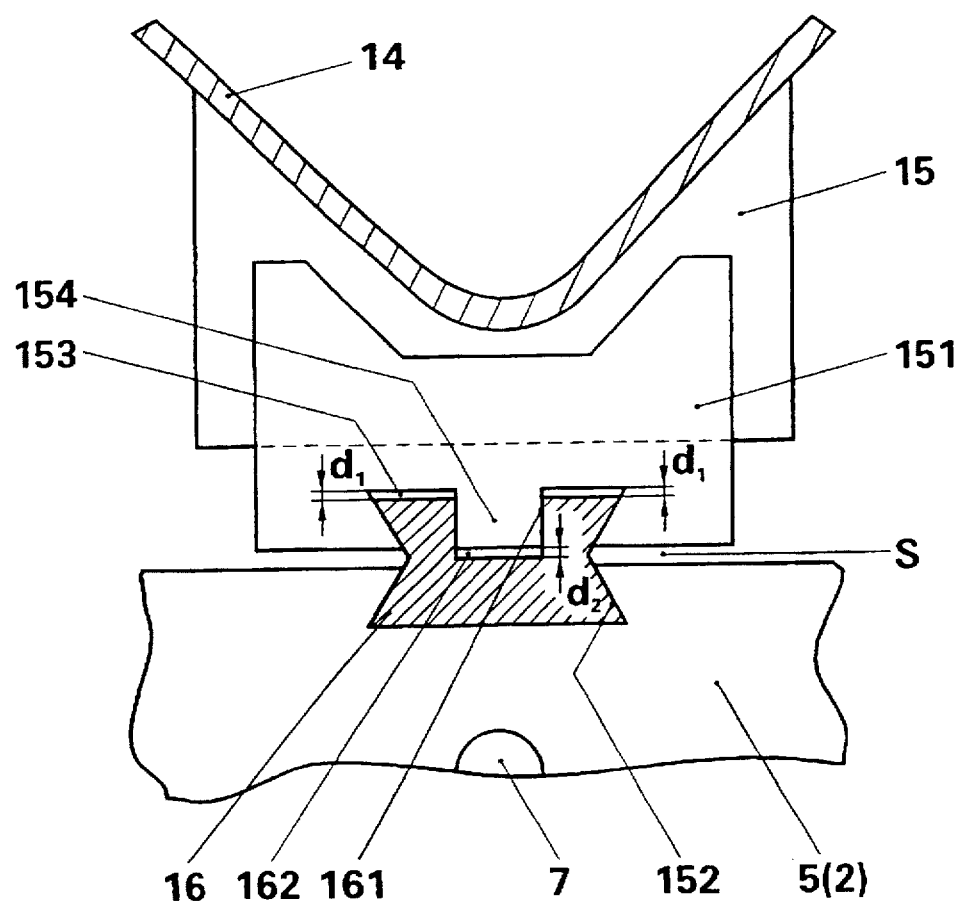
FIG. 3a shows the detail X from FIG. 3 on- an enlarged scale.
Figure 4:
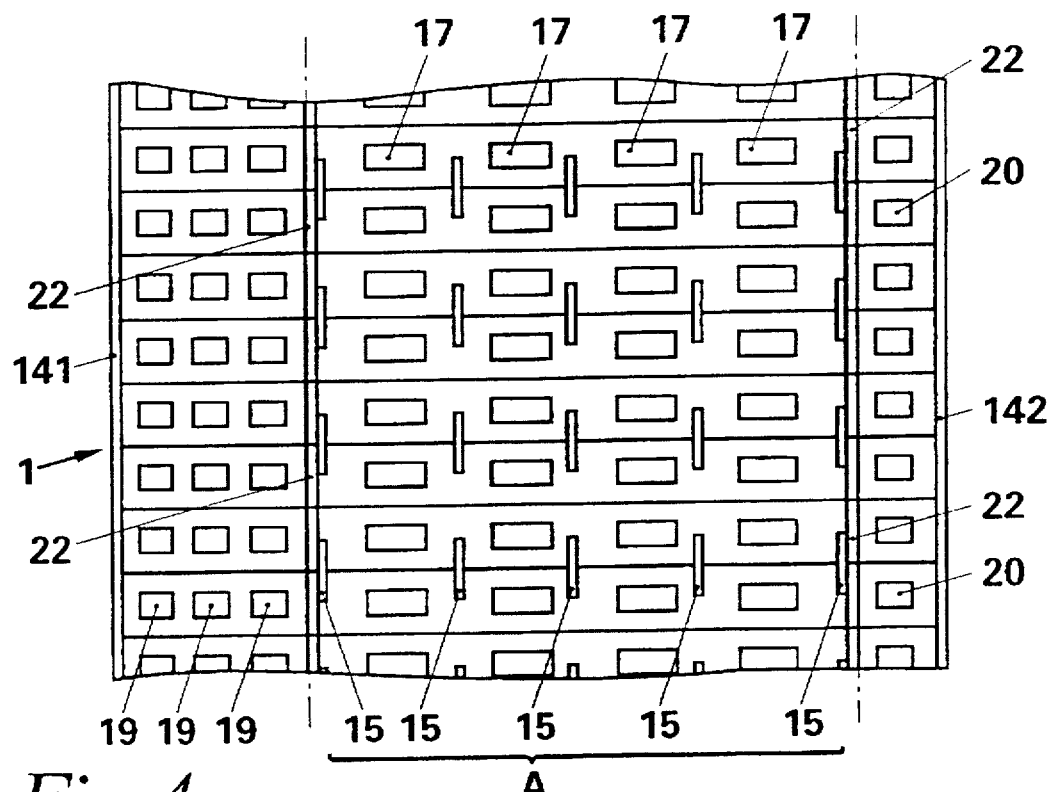
FIG. 4 shows a plan view of the (developed) inner wall of the housing ring, provided with cavities according to FIG. 3, of the bulb-type generator according to FIGS. 1 and 3.

For mounting reasons and for the purpose of facilitating adjustment, the connection between the V-shaped spacer elements 14, the mounting plates 15 and the strips 16 is not performed directly but with the insertion of an intermediate plate 151 which (in the final state) is permanently connected, for example welded, to the mounting plate 15 (compare detail X from FIG. 3 in FIG. 3a). On its radially inward side, said intermediate plate 151 has a trapezoidal groove 152 in which approximately half of the strip 16 is situated. The groove depth is dimensioned in this case such that a gap 153 with a width $d_1$ of approximately 1 to 2 mm is produced between the groove base and the outer surface of the strip 16. In this arrangement, the intermediate plate 151 may not directly abut the stator laminated body, that is to say the gap 153 must be smaller than the gap S between the laminated body and intermediate plate 151. A warm laminated body and cold housing are capable in this way of moving until this play (gap 153) is eliminated. It is only upon further expansion that a press fit is produced between the intermediate plate 151 and strip 16. Guide elements acting in the circumferential direction are provided in order to ensure the preservation of the roundness of the laminated body in this phase. Said guide elements consist of a lug 154 pointing radially inward from the groove base of the groove 152 and having parallel side flanks on the intermediate plate 151, which engages in a self-closed fashion in a rectangular groove 161 on the radially outward surface of the strip. In this arrangement, the groove depth is dimensioned, in turn, such that a gap 162 of 1 to 2 mm and with a width $d_2$ remains between the lug 154 and the groove base of the groove 161.

This indirect connection described between the spacer elements 14 and the stator laminated body facilitates the mounting and adjusting of the stator laminated body with respect to the housing. Moreover, it fulfils two essential requirements which are typical of bulb-type generators:

it ensures the possibility of free radial dilatation (warm laminated body/cold housing around which the flowing water flows;

radial rigidity on the action of magnetic forces (4-node vibration) in the event of a fault.

As is clear immediately from FIG. 3, the spacer elements 14 extending over the entire inner circumference of the housing ring in a fashion comparable to a bracing. This braced structure is additionally strengthened by the stator laminated body 2, which is suspended in the double swallowtailed strips. The mounting plates 15, which are preferably produced from sheet metal by laser cutting, serve simultaneously as adjusting elements and are welded to the spacer elements 14 with the aid of a gauge. This eliminates expensive recessing of the housing by turning it before laminating the stator laminated body.

Although the inner surface of the housing ring around which on the outside the flowing water flows is enlarged by the installation of the spacer elements 14, it is now possible according to the invention for the stator housing to be air-cooled or water-cooled in conjunction with a virtually unchanged design.

In the case of air cooling, there are provided in the limbs of the spacer elements 14 in the region of the stator laminated body 2 first openings 17 which produce a free connection between the radial cooling slits 4 in the stator laminated body 2 and the cavities 18 of the spacer elements 14. The (heated) cooling air emerging from the stator laminated body 2 through these openings 17 and said cavities 18 can now be removed- to the two machine end faces. Because these axial channels immediately adjoin the housing ring and thus the flowing water, this air is already cooled down on the way to the machine end faces.

Provided on both end faces and outside the active part A are second openings 19 and 20 in the limbs of the spacer elements 14, via which the air leaves the said channels again. On the way to the coolers in the spherical cap, this air, which has already been cooled down a little, flows through the winding overhang 8 and also the winding connections and leads 12, which are thermally highly loaded. The splitting up of the cooling air on the two sides of the machine is performed in this case by the size of the areas of passage of the second openings 19 and 20. The exterior 21 of the spacer elements 14 in a first space located radially between the stator laminated body and the housing, into which air flowing out of the stator laminated body 2 firstly flows is partitioned off from the overhang spaces 10 and 11 by means of triangular sealing plates 22.

Figure 6:
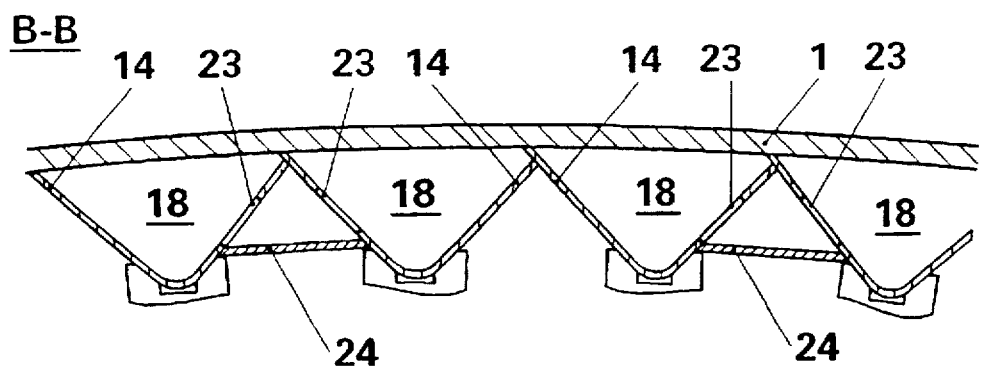
FIG. 6 shows a cross section through the cavities in accordance with FIG. 5 along the line BB therein.

In the case of water cooling, both the first and the second openings 17 and 19 in the limbs of the spacer elements 14 are eliminated. For this purpose, the channels or cavities 18 bounded by the spacer elements 14 and the housing ring are alternately connected hydraulically at one end near the flange rings 141 and 142, so that cooling water can circulate in them in the stator housing in a meandering fashion (compare FIG. 5). To achieve this, in the case of the example triangular cutouts 23 are provided on said end, to which a roof-like cover 24 connecting neighbouring limbs of the spacer elements 14 is assigned (compare FIG. 6). This results in the meandering flow of cooling water illustrated in FIG. 5 by dashed lines.

Figure 7:
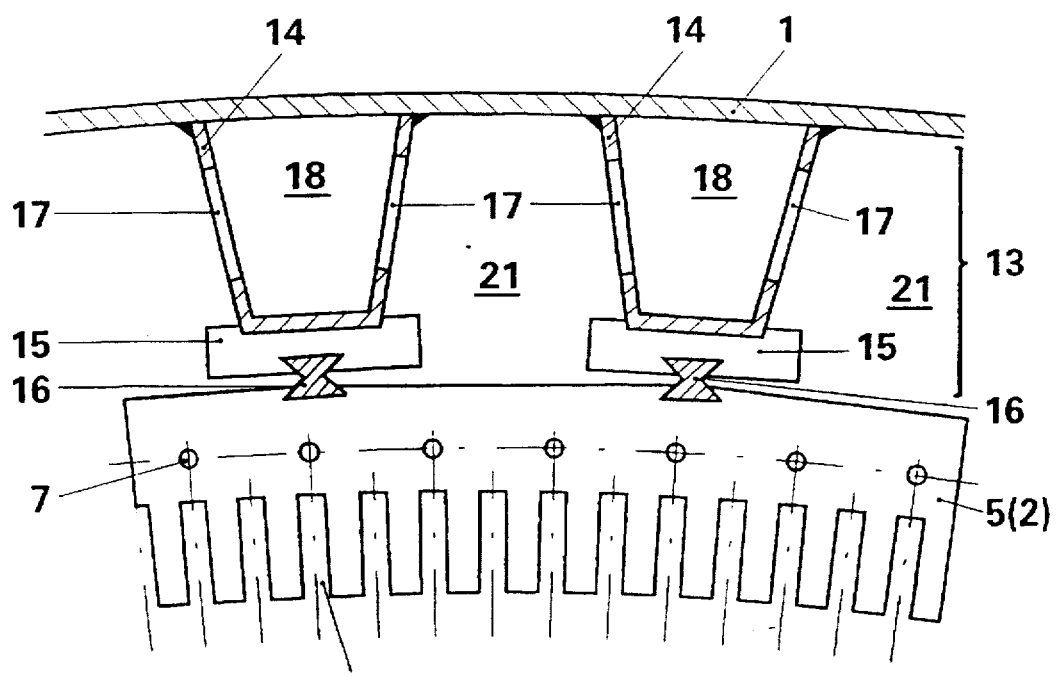
FIG. 7 shows a modification of FIG. 3 with trapezoidal cavities as spacer elements.

As illustrated in FIG. 7, the spacer elements 14 can also have a trapezoidal cross section, the wider base being situated outside. In contrast to the variant having V-shaped spacer elements, the free limb ends are then clearly spaced from one another. Otherwise, the design and function of the variant represented- in FIG. 7 corresponds to what has been described so far.

If for operational or other reasons, it should prove to be necessary to suspend the stator laminated body 2 in a radially elastic fashion in the reinforced housing ring 1, this can be achieved without the framework outlined by the invention and by means of simple structural measures which can be used both for the air-cooled and for the water-cooled housing cooling.

Figure 8:
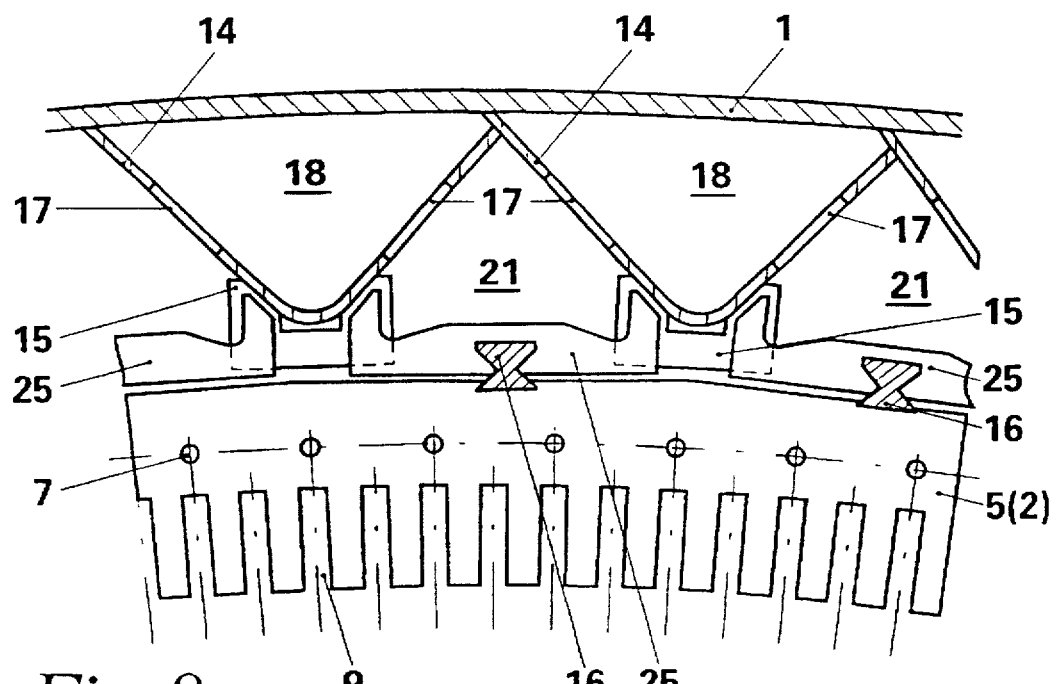
FIG. 8 shows a modification of FIG. 3 in which spring members are arranged between the stator laminated body and spacer elements.

In FIG. 8, the double swallowtailed strips 16 in which the stator laminated body 2 is suspended are no longer welded directly to the mounting plates 15, but elastic members in the form of U-shaped intermediate plates 25 have been interposed. One limb of the intermediate plate 25 is welded to one mounting plate 15, while the other limb is welded to the neighbouring mounting plate 15 in the circumferential direction. In the part connecting the two limbs, the intermediate plates 25 have a swallowtailed groove in a manner analogous to the mounting plates 15 of FIGS. 3 and 4, into which the strips 16 are inserted. By dimensioning the cross section of said connecting part and its geometry, the intermediate plates are more or less flexible radially, and in this way render possible radially elastic suspension of the stator laminated body 2 in the housing ring 1. The reinforcing and cooling functions of the spacer elements 14 are not impaired in this arrangement.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A bulb type generator comprising:
   a housing;
   a stator laminated body positioned within said housing such that said housing forms therein a first space positioned radially between said stator laminated body and said housing, and an overhang space beyond at least one end of the stator laminated body and containing wiring overhangs of the stator, said stator laminated body comprising a plurality of spaced component laminated bodies, each formed of overlappingly laminated segmental stampings;
   a plurality of spacer elements having wide ends at an inner wall of said housing said spacer elements supporting said stator laminated body and forming cavities extending over substantially the entire length of said stator laminated body;
   a plurality of circumferentially extending mounting plates provided on narrow ends of said spacer elements;
   a plurality of axially extending strips connecting said stator laminated body to said mounting plates with radial play so that said stator laminated body is mounted to said housing ring with radial play; and
   openings in said spacer elements at locations corresponding to said first space and said overhang space, said openings forming a cooling fluid flow path from the spaces in said component laminated bodies, through said cavities, and to the overhang space.

2. The bulb type generator of claim 1 including a plurality of sealing plates substantially partitioning air in the first space from the overhang space except through said cavities.

3. The bulb-type generator as claimed in claim 1, wherein the strips are arranged on intermediate plates and guided in the circumferential direction, which intermediate plates are permanently connected to the mounting plates.

4. The bulb-type generator as claimed in claim 3, wherein radially inward of the portion intermediate plates have a swallowtailed recess in which half of the strip is situated, and radially outward portions of the strips have a groove with a rectangular cross section in which a lug constructed on the intermediate plate engages in a self-enclosed fashion.

5. The bulb-type generator as claimed in claim 1 including radially elastic spring members in the form of intermediate plates, wherein the strips are mounted on the mounting plates and thus also on the elements via the spring members.

6. The bulb-type generator as claimed in claim 1, wherein the strips are mounted directly on the spacer elements with the interposition of mounting plates.

7. The bulb-type generator as claimed in claim 1, wherein with the interposition of radially elastic spring members in the form of intermediate plates the strips are mounted on the mounting plates and thus also on the spacer elements.

8. A bulb type generator comprising:
   a housing comprising a housing ring;

a stator laminated body positioned within said housing ring, said stator laminated body comprising a plurality of spaced component laminated bodies, each formed of overlappingly laminated segmental stampings;

a plurality of spacer elements having wide ends at an inner wall of said housing ring, said spacer elements supporting said stator laminated body and forming cavities extending over substantially the entire length of said stator laminated body in the direction of the axis of said housing ring, wherein ends of said spacer elements have cutouts arranged such that facing pairs of cutouts are formed at alternating ends of adjacent ones of said spacer elements; and covers connecting said adjacent ones of said spacer elements so as to form at least one fluid flow path between the adjacent ones of said spacer elements and through the respective facing pairs of cutouts, so that a cooling fluid in the spacer elements follows a meandering flow path.

9. The bulb type generator of claim 8, wherein said covers are configured so as to form two independent fluid flow paths between the adjacent ones of said spacer elements and through the respective facing pairs of cutouts.

* * * * *